United States Patent [19]
Wemhoener

[11] 3,956,058
[45] May 11, 1976

[54] MULTIPLE-PISTON PRESS FOR SYNTHETIC-RESIN COATING OF LARGE SURFACE-AREA WORKPIECES

[76] Inventor: Heinrich Wemhoener, Lehmkuhlenweg 30, D-49 Herford, Germany

[22] Filed: Sept. 13, 1974

[21] Appl. No.: 505,911

[52] U.S. Cl. .............................. 156/583; 100/93 P; 100/265
[51] Int. Cl.² ................... B32B 31/00; B30B 15/34; B30B 1/00
[58] Field of Search .............. 100/265, 269, 93 PR; 156/580, 583

[56] References Cited
UNITED STATES PATENTS

| | | |
|---|---|---|
| 3,323,446 | 6/1967 | Alpini .............................. 100/93 P |
| 3,334,579 | 8/1967 | Smith ................................. 100/265 |
| 3,709,762 | 1/1973 | Chandler .......................... 100/93 P |
| 3,788,211 | 1/1974 | Mason ............................... 100/265 |

Primary Examiner—Douglas J. Drummond
Attorney, Agent, or Firm—Otto John Munz

[57] ABSTRACT

A multiple-piston press for synthetic-resin coating of large surface-area workpieces is provided with heatable pressure plates mounted horizontally superimposed within a pressure frame to form a gap intended for holding the material to be subjected to pressure. Hydraulic piston-cylinder units are provided for carrying out the pressing process by pressing the plates against each other.

11 Claims, 4 Drawing Figures

FIGURE 4.

AUTOMATIC CONTROL MEANS OF:

HEATING THE PLATES

LIFTING UPPER PLATE TO PROVIDE GAP BETWEEN IT AND LOWER PLATE

INSERTING WORKPIECE INTO THE GAP

DELIVERING RESIN COATING TO WORKPIECE

CAUSING A FREE FALL OF THE UPPER PLATE

INSERTING SPACERS BETWEEN UPPER PLATE AND THE VERTICALLY LIFTING PISTON-CYLINDER UNITS

COMPRESSING SPACERS WITH UPPER PLATE AND WORKPIECE AGAINST LOWER PLATE VERTICALLY

WITHDRAWING SPACERS LATERALLY

WITHDRAWING WORKPIECE

MULTIPLE-PISTON PRESS FOR SYNTHETIC-RESIN COATING OF LARGE SURFACE-AREA WORKPIECES

FIELD OF THE INVENTION

A press employing a loaded plate for a free fall followed by superimposing spacers on top of the plate combined with mechanical compression thereof. Class 100 Subclass 269+.

DESCRIPTION OF THE PRIOR ART

Multiple-piston presses of the prior art are provided with pressure plates, one of which is supported in the pressure frame in a stationary position, while the second is movable toward it, either by the same piston-cylinder units which produce the pressing pressure or by separate ones. During the feeding process of the material into the press the piston-cylinder units are not subject to pressure. They close the pressure-gap only after the workpiece which is to be subjected to the pressure has been deposited, on the lower pressure plate by a feeding unit. As a result thereof, the lower heatable pressure plate always exerts a considerably longer duration of its effect upon the workpiece than the upper pressure plate, and thereby the quality of the synthetic-resin coating is affected unfavorably.

Furthermore, the total duration of the pressing process depends on the lifting speed of the piston-cylinder units which has limits, which cannot exceed a certain value, and to this extent limits the operating speed of the multiple-piston press.

SUMMARY OF THE INVENTION

The primary objects of the invention are to improve the quality of the synthetic-resin coating of large-surface workpieces, as well as to increase the output of the press.

Thus another object of the invention is to provide a multiple-piston press with means to cause the upper pressure plate to descend in a free fall upon the material to be subjected to pressure after the workpiece is deposited on the lower pressure plate.

For additional compressive force short-lift piston-cylinder units are provided above the upper pressure plates and their compressive force is transmitted to them by spacers which are inserted, transversely to the moving direction of the piston-cylinder units, between these units and the upper pressure plate, as soon as the upper pressure plate has been placed upon the workpiece. The spacers are withdrawn laterally below the piston-cylinder units after completion of the pressing process.

In a preferred type of construction the spacers are connected and are moved jointly, f.i. by horizontally acting piston-cylinder units. A particularly speedy operation of the novel multiple-piston press is achieved by having the spacers slide along the upper pressure plate on an air cushion produced at their bottom side.

Thereby in contrast to the mechanics of the multiple piston presses of the prior art the duration of the effect of the upper pressure plate is largely adapted to the duration of the effect of the lower pressure plate, and thus the time during which the workpieces rest in the press is shortened, which in particular is required when quickly reacting melamine resins, f.i. in sheet form, are employed. The compressive force of the piston-cylinder units exerted upon the upper pressure plate does not begin immediately after the plate descends upon the workpiece, but the net weight of the upper pressure plate, as well as its immediate heating effect, even beforehand, permit a preparative flow of the coating material, the reaction of which is then completed under the subsequent pressure of the piston-cylinder units. A higher press output which results therefrom is furthermore increased by the fact that, due to the employment of short-lift piston-cylinder units, only very little time is needed for moving these units in and out of operative position. Operating speeds of similar magnitude could otherwise be achieved only by very expensive means, such as by the employment of hydraulic storage batteries or of higher pump outputs.

BRIEF DESCRIPTION OF THE DRAWINGS

There are shown in

FIG. 1, a plan view of a multiple-piston press of the invention; in

FIG. 2, the front view of the press in one embodiment; in

The same reference numerals denote the same or equivalent parts.

DESCRIPTION OF THE PREFERRED EMBODIMENTS

Figure 1:
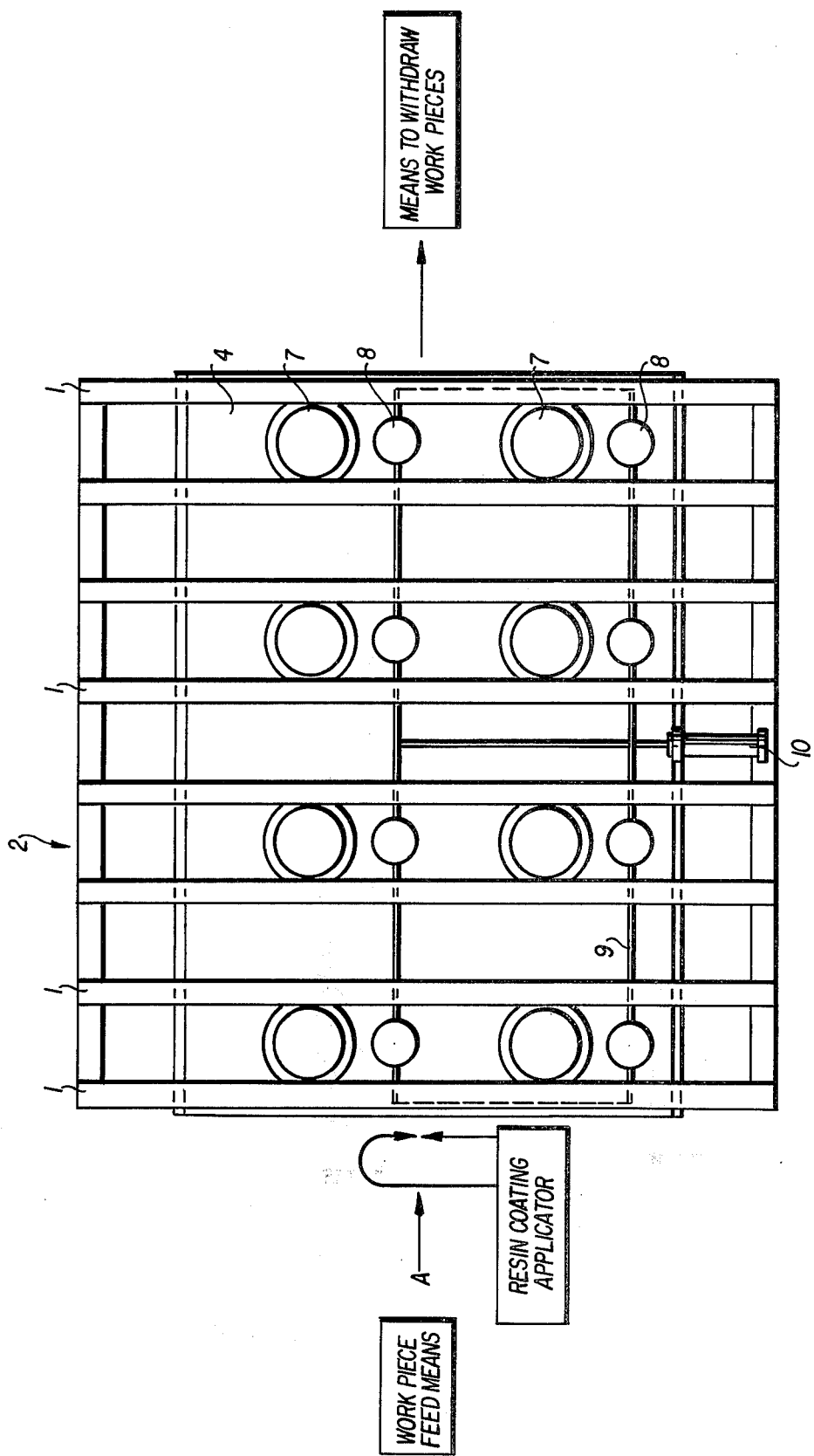
Figure 2:
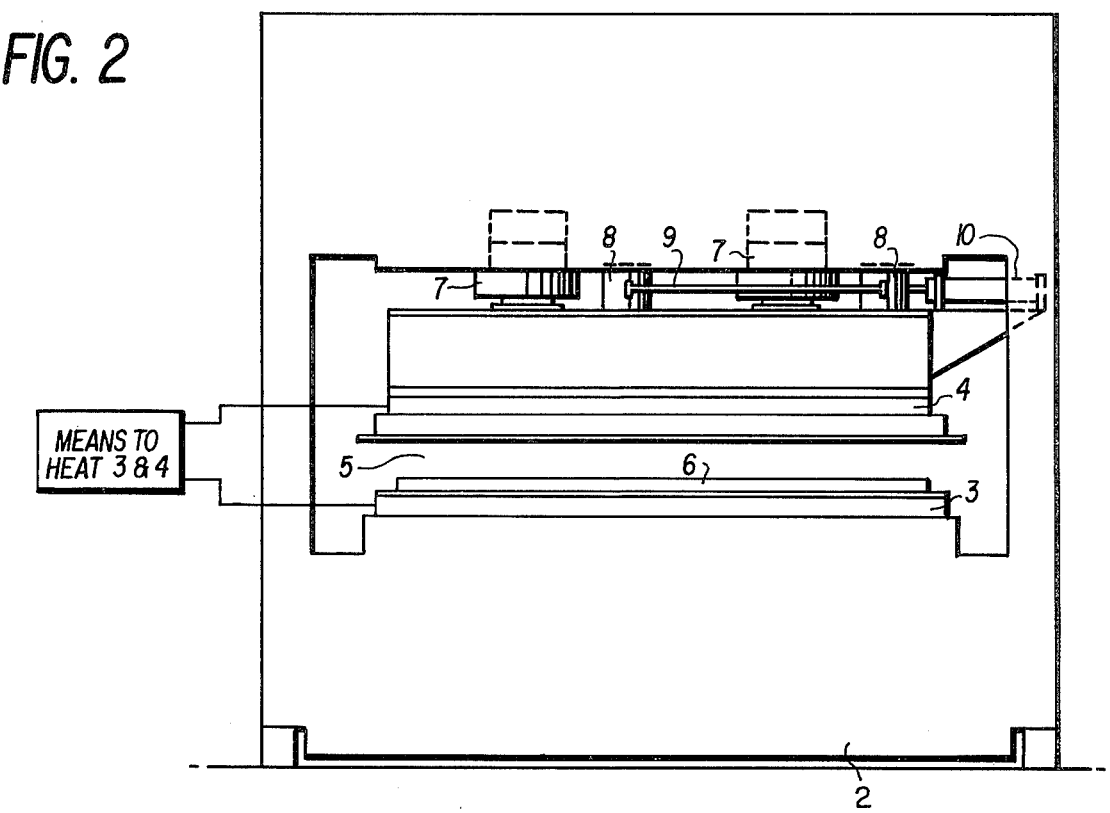

There is shown on FIGS. 1 and 2 the multiple piston press provided with a pressure frame 2 composed of crosspieces 1, two horizontally superimposed heatable pressure plates, a lower plate 3 and an upper plate 4. The lower pressure plate is supported by the pressure frame in a stationary manner. The upper pressure plate is suspended vertically movably toward the lower pressure plate. The two pressure plates provide a gap 5 which serves to hold the workpiece 6.

The workpiece, which has a large surface is introduced into the press by a conventional feed means in the direction of arrow A in FIG. 1, and is deposited there on the lower pressure plate, as shown in FIG. 2. The gap, is adapted to the level of the feed device. The synthetic-resin coating is applied to both sides of the workpieces by means such as conventional conveyor belts. Means are provided to heat controllably the plates. Means are provided to cause the upper pressure plate to descend immediately afterward in a free fall upon the workpiece and the thermal reaction upon the resin is initiated. Since, however, the net weight of the upper pressure plate still does not suffice to produce the required pressing pressure, short-lift piston-cylinder units 7 mounted above the upper pressure plate 4 are provided.

Figure 3:
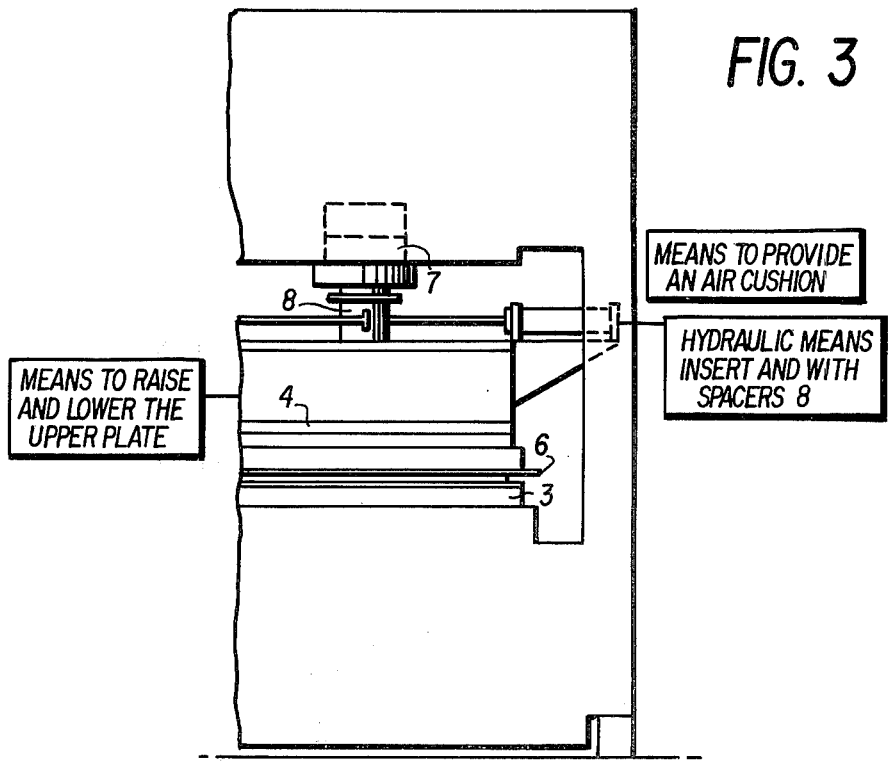
FIG. 3, a partial illustration of the same front view, with a portion cut off, in which, in contrast to FIG. 2, the upper pressure plate has descended upon the workpiece and is loaded by piston-cylinder units mounted above it; and in FIG. 4, a diagram of automatic control means of a preferred sequence of operations.

In order to bridge the distance between the piston-cylinder units and the lowered upper pressure plate shown in FIG. 3, spacers 8 are inserted, transversely to the moving direction of the piston-cylinder units, between these units and the upper pressure plate, as soon as the upper pressure plate has descended upon the workpiece.

After the conclusion of the pressing process, the spacers are withdrawn laterally from below the piston-cylinder units, so that the upper pressure plate can be returned into its initial position shown in FIG. 2 by means of separate lifting devices. The spacers are interconnected through a frame 9 engaged by a horizontal piston-cylinder unit 10 which produces the shifting movements of the spacers.

The movability of the spacers on the upper pressure plate is substantially facilitated by the provision of an air cushion produced on their bottom side, on which they slide.

The multiple-piston press of the invention decreases to an extremely short period the time during which the workpiece is subjected to pressure, due to the fact that the closure of the gap no longer depends on the speed of operation of the hydraulic piston-cylinder units, which produce the pressure, but is initiated, immediately after the deposition of the workpiece upon the lower pressure plate, by the upper pressure plate, which descends in a free fall upon the workpiece. The net weight of the upper pressure plate itself already is calculated to cause the synthetic resin material to flow and there is no delay in the subsequent onset of pressure, exerted by the piston-cylinder units, which otherwise would be delayed because they would have to be moved outwardly over the entire level of the gap. This distance is bridged now by the spacers whose lateral movement takes place far more rapidly. The same favorable conditions result when the gap is opened before the workpiece is withdrawn from the press by a discharge device.

Because the invention provides about the same duration of contact between the upper pressure plate and the lower pressure plate with the workpiece, improvement in the quality of the synthetic resin coating as well as optimum conditions for the application of very rapidly reacting melamine resin sheets are achieved.

The spacers offer also the possibility of compensating for all dimensional differences occurring in the pressing of workpieces of different thicknesses by corresponding adjustments of their levels.

What is claimed is:

1. A multiple piston-press for applying a resin coating material to workpieces of variable thicknesses having large surface areas, comprising:
   a pressure frame;
   at least two pressure plates, an upper plate and a lower plate, said plates mounted horizontally superimposed and normally spaced from each other in said pressure frame, to form a gap between them for accomodation of a workpiece;
   means to heat the pressure plates;
   means to introduce a workpiece into the said gap;
   means to apply an adhesive resin- coating material to said workpiece;
   said upper plate having a weight sufficient to compress it with said workpiece and said lower plate;
   means to cause a free fall of the upper plate after introduction of the workpieces into said gap.

2. A multiple piston-press as claimed in claim 1, said means to cause the free fall of the upper plate further comprising:
   means to create an additional compressive force upon said upper plate and workpiece beneath it subsequent to the free fall of said upper plate.

3. A multiple piston-press as claimed in claim 1, said means to cause the free fall of said upper plate further comprising:
   spacers;
   vertically acting piston cylinder units mounted to act from above the upper plate to create additional compressive force upon said spacers, said upper plate and said workpiece;
   means to insert the said spacers upon the upper plate, and
   means to withdraw said spacers from beneath said piston units upon completion of the pressing process.

4. A multiple piston-press as claimed in claim 3, said means to insert and said means to withdraw said spacers being means to do so transversely to the moving direction of said piston-cylinder units.

5. A multiple piston-press as claimed in claim 3, said means to insert and said means to withdraw said spacers being horizontally acting piston-cylinder units, said spacers being integrally connected and moved jointly by said horizontally acting piston-cylinder units.

6. A multiple piston-press as claimed in claim 3, further comprising means to create an air cushion on the lower side of said spacers, along the upper pressure plate to permit a smooth sliding of said spacers thereover during their insertions and withdrawals.

7. A multiple piston-press as claimed in claim 3, said vertically acting piston cylinders being hydraulically operated cylinders.

8. A multiple piston-press as claimed in claim 5, said horizontally acting cylinders being hydraulically acting cylinders.

9. A multiple piston-press as claimed in claim 1, further comprising means to heat said plates controllably.

10. A multiple piston-press as claimed in claim 3, further comprising an automatic means to control the sequence of operations of the cycle of:
    heating the plates;
    lifting the upper plate to provide the gap;
    inserting a workpiece into said gap by said horizontal cylinder unit;
    delivering the resin coating material to the workpiece;
    causing a free fall of the upper plate;
    inserting the spacers between the upper plate and the vertically lifting piston-cylinder units;
    compressing the spacers with the upper plate and the workpiece by said vertical cylinder units;
    withdrawing the spacers by horizontal piston-cylinder units and
    withdrawing the coated workpiece.

11. A piston-press for laminating workpieces of variable thicknesses and large surface areas with synthetic resin coating material as claimed in claim 1, further comprising:
    means to heat said pressure plates;
    at least one short-stroke vertically acting piston cylinder unit mounted in said frame to act from above the upper plate to compress it to said workpieces additionally to the compressive force of said upper plate; and
    at least one spacer with means to insert said spacer between said piston cylinder units and said upper plate after it descended on the workpiece and to withdraw said at least one spacer from beneath said at least one piston cylinder unit upon completion of the pressing process.

* * * * *